Patented Nov. 19, 1940

2,221,957

UNITED STATES PATENT OFFICE 2,221,957

SALAD DRESSING

Walter F. Straub, Chicago, Ill., assignor to W. F. Straub & Company, Chicago, Ill., a corporation of Illinois No Drawing. Application March 14, 1938,
Serial No. 195,828

1 Claim. (Cl. 99—144)

This invention relates to salad dressings and has more particular reference to honey salad dressings.

It is a general object of the invention to provide a new and improved salad dressing having an unusual smoothness of taste and richness of flavor.

It is a further object of the invention to provide a new and improved salad dressing which may be cheaply produced on a commercial scale by using the less expensive grades of cooking oils and which at the same time possesses the desirable characteristics of flavor and texture of the salad dressings made with expensive oils.

More specifically stated, it is an object of the invention to provide a salad dressing containing honey, as the sweetening agent, which cooperates with the oil base to provide an unusually smooth and rich salad dressing, and in which the oil utilized may be of one of the cheaper grades such as cotton seed oil or corn oil in place of olive oil.

One of the well known objections to the present day commercial salad dressings containing the cheaper grades of oil such as cotton seed oil and corn oil in combination with the usual ingredients of mayonnaise, boiled dressing, or French dressing, is that the use of such cheaper grade of cooking oil imparts an undesirable corny or mealy taste to the dressing. In home-made dressings this undesirable flavor and texture is avoided by the use of olive oil. However, the excessive expense accompanying such procedure has been found prohibitive in so far as commercial production is concerned. The customary commercial mayonnaise comprises cane sugar as a sweetening agent, eggs, cotton seed oil or corn oil, vinegar and various spices and condiments.

The present invention contemplates the use of honey instead of cane sugar as the sweetening agent. It has been found that such a combination eliminates the mealy taste normally found in salad dressings in which cheaper grades of oil than olive oil are combined with the cane sugar, and at the same time gives the dressing a richer flavor and a smoother appearance and taste. The honey imparts the necessary sweetness to the dressing, as does the cane sugar in the usual dressing, and has the additional functions of modifying the corn or cotton seed oil to eliminate its mealy taste, giving the product a rich and creamy flavor and also the desired physical properties of smoothness of texture and homogeneity.

To this end the instant invention is applied to the production of mayonnaise, boiled dressing and French dressing, each of which salad dressings includes, as essential elements, a sweetening agent and an oil base. The difference between mayonnaise and boiled dressing is that mayonnaise contains only the above mentioned ingredients, whereas a boiled dressing contains, in addition, a starch base. French dressing includes neither a starch base nor eggs.

A honey mayonnaise composition typical of the instant invention includes the following ingredients and their proportions:

|  | Pounds | Ounces |
|---|---|---|
| Egg yolk | 7 | 8 |
| Corn or cotton-seed oil | 63 | 8 |
| Honey | 4 | |
| Vinegar | 7 | 8 |
| Salt | | 10 |
| Mustard | | 8 |
| Onion powder | | ¼ |

A honey boiled dressing typical of the instant invention includes the following ingredients and their proportions:

|  | Pounds | Ounces |
|---|---|---|
| Egg yolk | 4 | 8 |
| Corn or cotton-seed oil | 33 | 8 |
| Honey | 3 | 4 |
| Vinegar | 2 | 8 |
| Starch base | 55 | 6 |
| Salt | | 6 |
| Mustard | | 8 |
| Onion powder | | ¼ |

The composition of a typical honey French dressing is as follows:

|  | Pounds | Ounces |
|---|---|---|
| Corn or cotton-seed oil | 15 | |
| Honey | 6 | 6 |
| Vinegar | 9 | |
| Cane sugar | 1 | 6 |
| Salt | 1 | 4 |
| Mustard | | 6 |
| Paprika | | 7 |
| Gum tragacanth | | 1½ |
| Tomato puree | 2 | 10 |
| Water | | 8 |

I do not confine the invention to the above proportions, but present them merely as illustrative compositions embodying the principle of the invention, the proportions, in fact, being relatively immaterial in so far as the instant invention is concerned.

The function of the honey is primarily that of an oil modifier and, as such, a relatively low proportion of honey to oil may be employed to effect the desired result. The honey need not be added in sufficient quantity to produce what is understood in the art as a sweet salad dressing in which the sweetening agent acts as a masking ingredient to conceal the presence of oil. The invention is preferably applied to produce a true or characteristic salad dressing, wherein the presence of oil is readily palpable and wherein the honey is added in only a sufficient quantity to eliminate the undesirable characteristics of the vegetable oil.

The product includes the combination of honey and corn or cotton seed oil, but it is to be understood that the term corn or cotton seed oil is used to include all vegetable cooking oils of the lower grades such as soy bean oil and vegetable oils in general or any of the grades of oils used or adapted for commercial salad dressings.

The use of ordinary honey incorporated in such a salad dressing, in all probability, would subject the composition to some fermentation due to the enzymes contained in natural honey. To this end the honey is subjected to pasteurization before it is incorporated in the dressing to effect sterilization thereof in order to obviate any possibility of fermentation.

It will be apparent from a consideration of the foregoing that a novel salad dressing has been provided which may be inexpensively produced by using the cheaper grades of cooking oils and which at the same time, embodies the more desirable characteristics of salad dressings made with the more expensive grades of oil such as olive oil.

I claim as my invention:

In a salad dressing, the combination including honey and vegetable oil, the honey being in sufficient quantity relative to the oil to eliminate the corny and mealy taste of the oil but insufficient to mask the presence of the oil.

WALTER F. STRAUB.